May 12, 1964     A. BAUDOU     3,132,874
SKI
Filed Oct. 9, 1961                       2 Sheets-Sheet 1
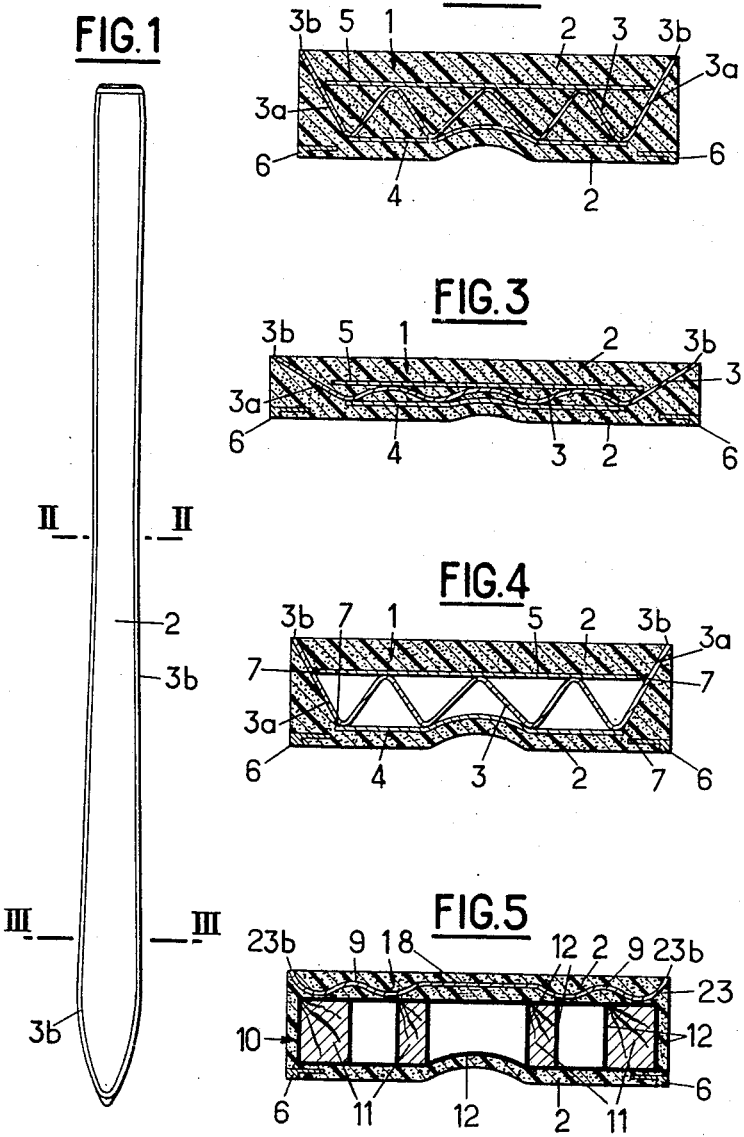

United States Patent Office 3,132,874
Patented May 12, 1964

3,132,874
SKI
Antoine Baudou, Les Eglisottes (Gironde), France
Filed Oct. 9, 1961, Ser. No. 143,691
Claims priority, application France Oct. 12, 1960
1 Claim. (Cl. 280—11.13)

Among the plurality of types of skis presently existing, some of them has a smooth web made from wood or metal and longitudinally embedded in a coating constituted by a synthetic resin which is usually reinforced by some fibrous material.

Other skis comprise alternate layers of a thermosetting material and of a flexible fibrous material.

One knows also skis including a recessed body made from synthetic resin and incorporating in the median portion thereof a rigid core of wood or the like.

Generally, all such types of skis, which are difficult to build, are far from insuring completely satisfactory results as far as one considers weight, resistance to impacts and torsional strains, as well as rigidity, which must yield to some longitudinal and transversal resiliency, and finally the absence of sensitiveness to atmospheric conditions.

The present invention has for its object to provide an improved ski having a structure which is adapted to solve as perfectly as possible the abovementioned complicated problems.

Said ski is essentially characterized by the fact that it comprises an integral web or reinforcing member, which is embedded in a coating of a thermosetting material, e.g. a polyester resin, and has a corrugated cross-section in which the valleys formed by the corrugations may be either filled with said thermosetting material or left completely or partially empty.

In one embodiment of the present invention, the abovementioned integral web is constituted by a corrugated element made from a metal, or a composite laminated material firmly compressed, inserted between two base plates, while said thermosetting coating in which said element is embedded has a laminated structure and is constituted by a polyester resin mixed with glass fibers or textile fibers.

In another embodiment, said coating comprising the ski body is hollow and receives in the longitudinal recess thereof the aforementioned corrugated integral element.

In still another embodiment of my invention, said corrugated element has in the medial part thereof a plane surface followed by corrugations extending in a longitudinal direction and said element is associated with a base plate constituted by side members which are embedded in a thin sheet of laminated polyester.

A similar arrangement may be realized utilizing either parallel tubes which are set or not in a side by side relationship and are inserted between two base plates or a single recessed member made from a laminated resin and formed e.g. by a casting or extrusion process.

In any case, one or more components of the integral web may be used for reinforcing the upper longitudinal sharp edges, and if desired the lower sharp edges, of the ski body, such sharp edges being provided or not with the conventional ski edges.

In the annexed drawings there has been shown in an illustrative and by no means limitative manner various embodiments of a ski according to this invention.

In the drawings:

FIG. 1 is a schematic top plan view showing one of said embodiments of a ski according to this invention;

FIGS. 2 and 3 are sectional views taken from II—II and III—III, respectively, in FIG. 1;

FIGS. 4, 5, 6, 7, 8, 9 and 10 are similar cross-sections of alternative embodiments of the ski shown in FIG. 1.

Figure 6:
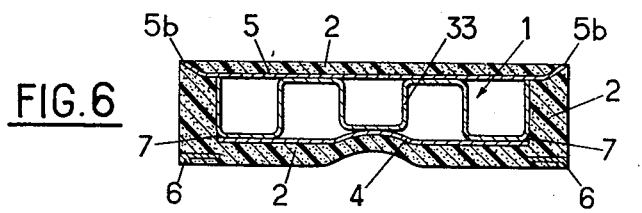

Referring now to the drawings, the embodiment shown in FIGS. 1, 2 and 3 is constituted by a web or reinforcing member generally indicated by the reference 1 and embedded in a coating 2, made e.g. from a thermosetting resin reinforced with glass fibers, textile fibers or laminated polyester. Reinforcing member 1 comprises a corrugated element 3 inserted between two base plates 4 and 5, the assembly being entirely embedded without any void in coating 2.

Said corrugated element 3 and base plates 4 and 5 are preferably made from some metal or resin which has been laminated under high pressure.

The longitudinal edges 3a of said corrugated element 3 are directed upwardly and terminate at 3b along the longitudinal sharp edges of said coating 2 which are thus reinforced.

In the embodiment shown in FIG. 4, the reinforcing member or web, which is also embedded in a coating similar to that in FIGS. 2 and 3, is hollow. It comprises a corrugated element 3 on which two base plates 4 and 5 are welded, as at 7.

In the alternative form shown in FIG. 5, the ski web is constituted by a corrugated element 23 including, on either side of the median part 8 thereof which is plane, corrugations 9 small in height. As in the above described embodiments the edges 23b of said corrugated element 23 are flush with the upper sharp edges of the ski body 2 and reinforce them.

A base plate generally designated by the reference numeral 10, which lies under said element 23, is built up with suitably braced side member 11, made from wood or some other light in weight material and embedded in a thin sheet 12 of laminated polyester.

The reinforcing member so constructed is embedded in a coating made from a thermosetting resin reinforced with glass fibers or laminated polyester.

Figure 7:
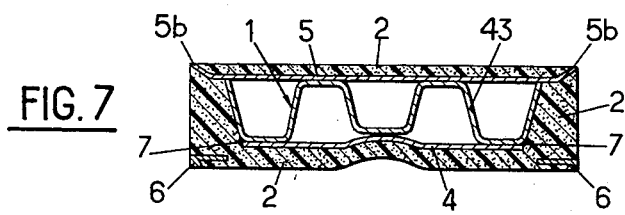

In FIG. 6, it can be seen that the element 33 of the ski reinforcing web comprises corrugations having a square cross-section, while such corrugations have a trapezoidal shape in FIG. 7, it being understood that such corrugations may as well have any other desired cross-section.

Figure 8:
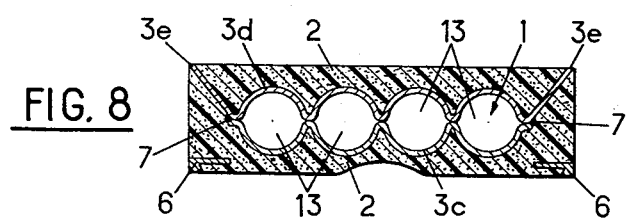

In the case of FIG. 8, the reinforcing member 1 consists of two channel elements 3c and 3d having longitudinal corrugations the cross-section of which is hemicylindrical, said corrugations being superimposed so as to form contiguous parallel channels 13. The edges of the outermost corrugations of the channel elements 3d are extended up to 3e, so as to reinforce the sharp edges of the ski body.

Figure 9:
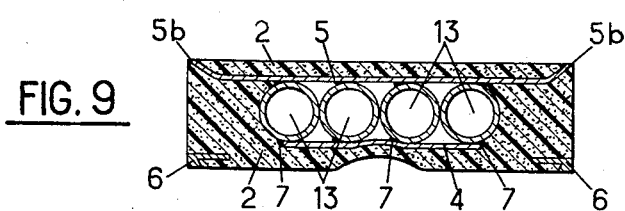

In the embodiment shown in FIG. 9, channels 13 referred to in connection with FIG. 8 are obtained by means of tubes which are clamped between two base plates similar to those above described.

Longitudinal edges 5b of the upper base plate 5 reinforce the upper sharp edges of coating 2.

Figure 10:
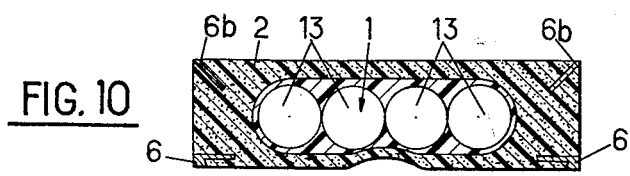

An alternative form of the devices illustrated in FIGS. 8 and 9 is shown in FIG. 10. In this case, the web or reinforcing member consists of a single recessed element made from a laminated resin. Said element comprises a series of contiguous parallel channels 13 having a cross-section which may be circular or not. Such element may be made by means of a casting or extrusion process.

In all the above described embodiments, conventional ski edges 6, 6b are embedded in the coating material 2. If desired, said ski edges may be replaced by extensions (not shown) of the edges of the web components.

A ski constructed according to my invention has, among others, the following properties: despite its low weight, it has a paramount resistance and resiliency, which are perfectly distributed along the whole length thereof, its longitudinal sharp edges are protected and reinforced by edges 3b, 5b and 3e of the web thereof, and coating 2 makes said ski virtually non responsive to atmospheric changes, thus preventing any distortion thereof.

What I claim is:

A ski comprising a reinforcing beam consisting of a corrugated member between two sheets, said beam being embedded in a laminated coating consisting of a polyester resin intermixed with fibrous material, the edges of said corrugated member extending through said coating to the corners between the sides and horizontal surfaces of the ski to form reinforcements for said corners.

References Cited in the file of this patent

UNITED STATES PATENTS

| | | |
|---|---|---|
| 1,671,642 | Hopkinson | May 29, 1928 |
| 2,404,402 | Porter | July 23, 1946 |
| 2,531,946 | Parker | Nov. 28, 1950 |
| 2,581,532 | Hem | Jan. 8, 1952 |
| 2,695,178 | Rheinfrank | Nov. 23, 1954 |

FOREIGN PATENTS

| | | |
|---|---|---|
| 733,250 | France | July 4, 1932 |
| 625,169 | Germany | Feb. 5, 1936 |
| 427,105 | Italy | Nov. 12, 1947 |
| 79,086 | Norway | Sept. 24, 1951 |
| 804,861 | Great Britain | Nov. 26, 1958 |
| 572,337 | Canada | Mar. 17, 1959 |
| 213,291 | Austria | Feb. 10, 1961 |